UNITED STATES PATENT OFFICE.

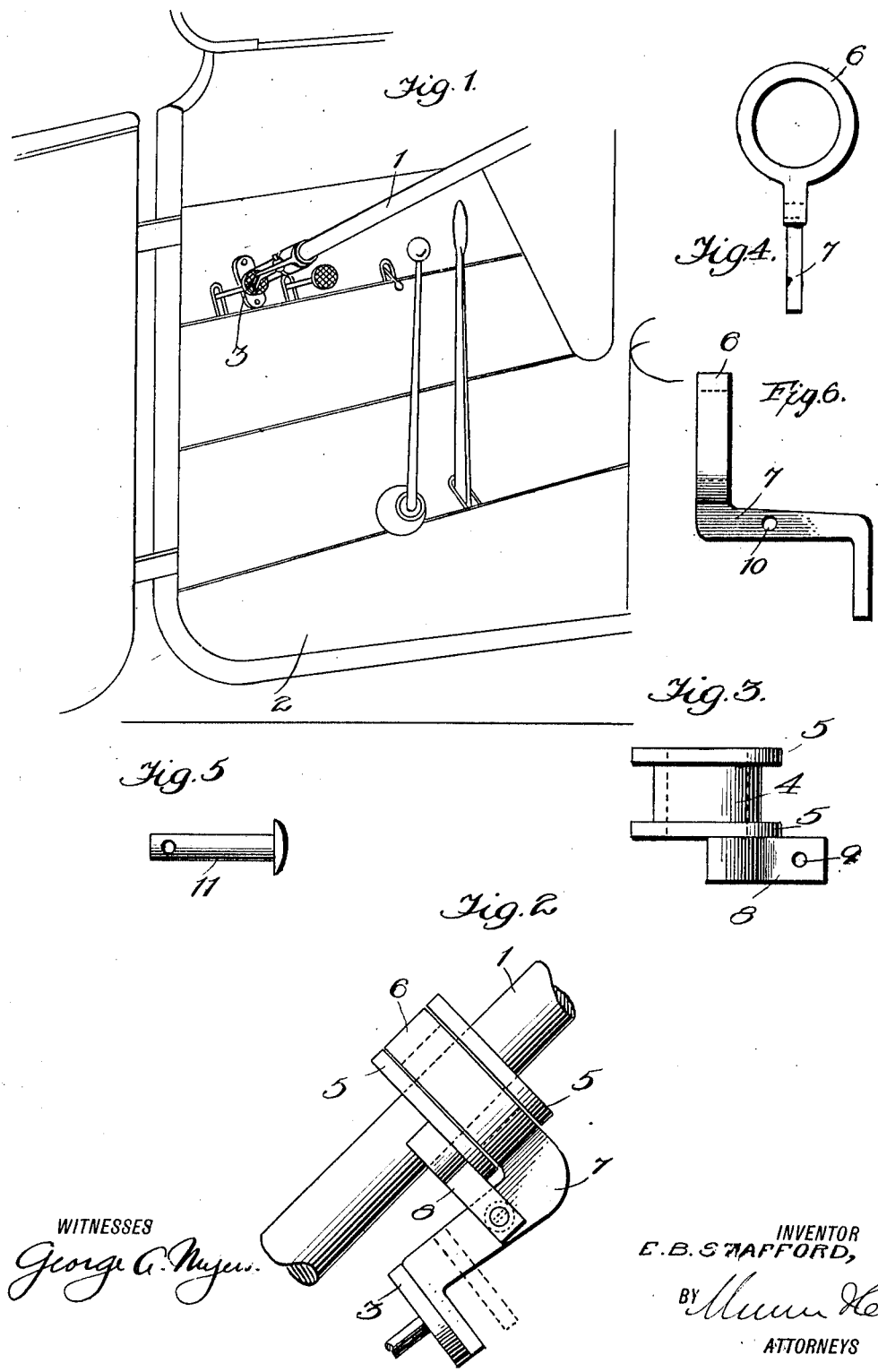

EDWARD BURKE STAFFORD, OF NEW ORLEANS, LOUISIANA, ASSIGNOR OF ONE-HALF TO JOHN R. McMAHON, OF NEW ORLEANS, LOUISIANA.

LOCK FOR MOTOR-VEHICLES.

1,314,713. Specification of Letters Patent. Patented Sept. 2, 1919.

Application filed December 20, 1918. Serial No. 267,696.

*To all whom it may concern:*

Be it known that I, EDWARD BURKE STAFFORD, a citizen of the United States, and a resident of New Orleans, in the parish of Orleans and State of Louisiana, have invented certain new and useful Improvements in Locks for Motor-Vehicles, of which the following is a specification.

My invention is an improvement in locks for motor vehicles, and has for its object to provide a device of the character specified capable of attachment to the steering gear and movable thereon into and out of operative position, and adapted to engage the clutch controlling pedal for holding the same in neutral position when desired, the said means being capable of being locked in desired position.

In the drawings:

Figure 1 is a perspective view of the controlling mechanism of a motor vehicle, provided with the improved lock;

Fig. 2 is a side view of the locking mechanism;

Fig. 3 is a side view of the collar;

Fig. 4 is a plan view of the clutch pedal engaging arm;

Fig. 5 is a plan view of the pin;

Fig. 6 is a side view of the pedal engaging arm.

The present embodiment of the invention is shown in connection with the steering column 1 of a motor vehicle 2, and the device is adapted to engage the clutch pedal 3 to hold the same in neutral position. A collar 4 is mounted on the steering column, the said collar having marginal flanges 5 at its top and bottom, providing between the flanges a bearing for the ring 6 of the holding arm 7 for the clutch pedal.

The collar 4 carries at its lower end a lug 8 extending substantially radial to the collar, beyond the adjacent flange 5, and this lug has an opening 9 for a purpose to be presently set forth. The holding arm comprises the ring 6 before mentioned and the radial arm 7, which consists of two parts integrally connected and offset laterally with respect to each other and substantially parallel.

One of the said parts is connected to the ring, and the other is adapted to engage the clutch pedal to hold the same depressed. The connecting portion has an opening 10 which is adapted to register with the opening 9 of the lug 8, and these registering openings are adapted to receive a pin 11 which has a transverse opening at the end remote from the head to receive the shackle of a padlock.

The ring 6 and the arm 7 are freely rotatable on the collar 4, so that the engaging portion of the arm may be brought into position over the clutch pedal 3 or may be moved away therefrom, to permit the free operation of the pedal.

When in place and not used for locking the pedal the arm 7 is swung out of the way, and when it is desired to lock the pedal the arm is swung to bring the engaging portion above the pedal, the pedal being first depressed to release the transmission. The pin 11 is now pushed through the registering openings 9 and 10, and the opening of the pin is engaged with a lock. The clutch is now disengaged and cannot be reëngaged to make the vehicle operative until the lock is released. At the same time the vehicle may be pushed or towed if desired.

I claim:

1. In a motor vehicle, the combination with the clutch controlling pedal and the steering column, of a collar secured to the column, an arm for engaging the clutch to hold the same depressed and having a ring journaled on the collar to permit the arm to be swung into and out of operative position, the collar having a substantially radial lug and the lug and the arm having registering openings for receiving a locking means, said locking means comprising a pin adapted to engage the opening and having a transverse opening for the shackle of a lock.

2. In a motor vehicle, the combination with the clutch controlling pedal and the steering column, of a collar secured to the column, an arm for engaging the clutch pedal to hold the same depressed and having a ring journaled on the collar to permit the arm to be swung into and out of operative position, the collar having a substantially radial lug and the lug and the arm having registering openings for receiving a locking means.

3. A device of the character specified comprising a collar adapted to be secured upon the steering column of a motor vehicle and having annular flanges at its ends, a ring journaled between the flanges and having an arm extending substantially parallel with the axis of the steering shaft and adapted at its free end to engage the clutch controlling pedal of the vehicle to hold the same in neutral position, and means for locking the arm to the collar.

4. In a motor vehicle, the combination with the clutch controlling pedal and the steering column, of a collar secured to the column, an arm for engaging the pedal to hold the same depressed, said arm being journaled on the collar to permit the same to be swung into and out of operative position, the collar and the arm having coöperating means for engagement by a lock to lock the arm to the collar to prevent swinging thereof.

EDWARD BURKE STAFFORD.

Copies of this patent may be obtained for five cents each, by addressing the "Commissioner of Patents, Washington, D. C."